Patented Jan. 13, 1931

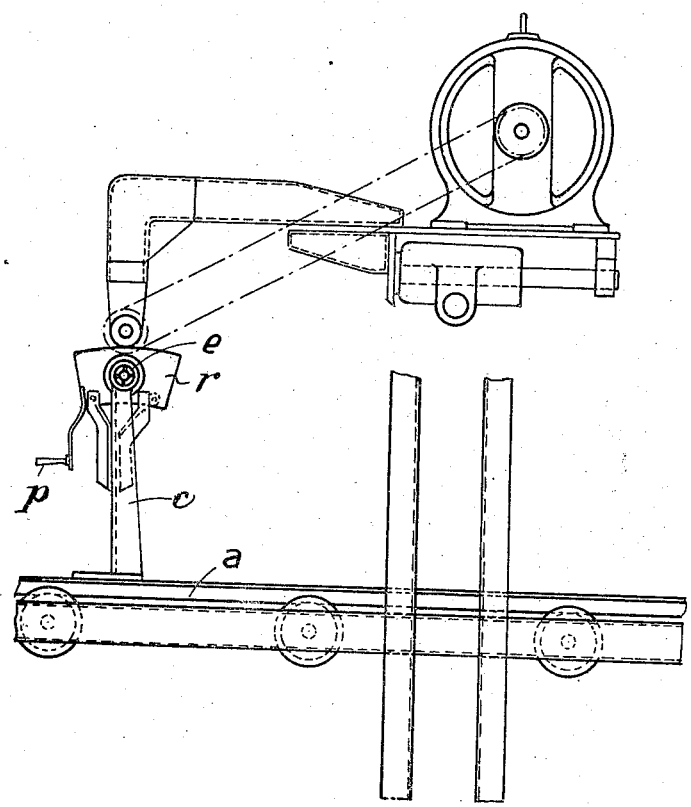

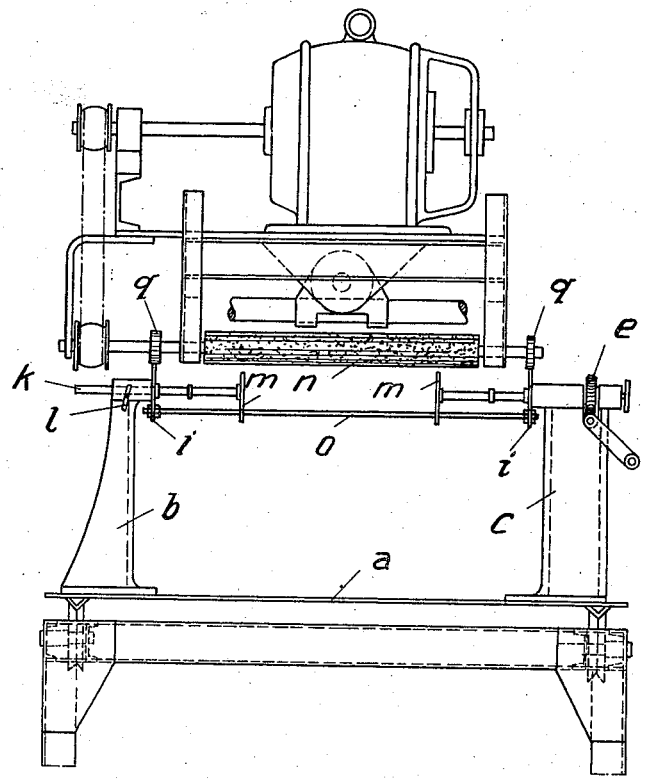
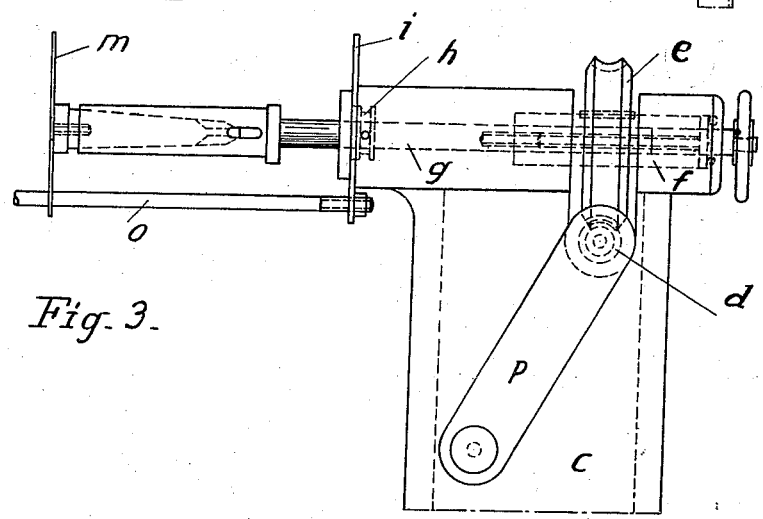

1,788,837

UNITED STATES PATENT OFFICE

WILHELM KOSFELD, OF DORTMUND, GERMANY, ASSIGNOR TO VEREINIGTE STAHL-WERKE AKTIENGESELLSCHAFT, OF DUSSELDORF, GERMANY

PROCESS FOR THE MANUFACTURE OF PIPE SHELVES, KEYSTONES, RING STONES, AND LIKE ARTICLES

Application filed September 26, 1927, Serial No 222,176, and in Germany October 1, 1926

This invention relates to a process for the manufacture of pipe shelves such as are required for instance for the insulation of pipe sections or piping, or for the manufacture of keystones, annular and profile stones and bricks for refractory and other purposes.

As is well known, owing to the process of burning, it is impossible to make such moulded articles especially hollow cylindrical or conical segments of the exact dimensions in the first instance. Consequently the articles must be trimmed at the place of use. This is very expensive, or inferior work has to be put up with. Irregular and considerable gaps are then produced in the refractory masonry, which as is well known mostly constitute the points of attack and the cause of destruction of the whole structure. It is possible by an apparatus suitable to be used to make economically such articles, with an accuracy hitherto unknown, which has a favourable effect in every respect.

The invention consists in a combination of ceramical and machining measures whereby such articles, the accurate sizing or adjusting of which is first advisable at the place of use, are produced by first moulding and then burning them with a supply of so much more material than will be necessary for the finished product that it is possible to obtain economically an accurate machine finishing of the peripheral profiles closed in themselves, whereupon these peripheral profiles are worked to the exact measurements on a grinding or milling machine.

A further feature of the invention is that the faces of the articles, being moulded and finally burned with oversize dimensions, are angularly located with respect to the peripheral profiles closed in themselves and are first ground for the purpose of obtaining faces for clamping the work.

An embodiment of the invention consists in that said articles being moulded and finally burned with oversize dimensions and then revolved about a horizontal axis in contact with an abrasive surface revolving about a second axis, which axis may be varied with respect to the first mentioned axis to give a definite shape and size to said articles revolving thereon.

The finishing-off of the articles preferably is carried out in this way, that the workpiece is clamped in a known manner below the swivelling tool between revoluble plates or jaws, rotatable templets on the spindles of said plates or jaws regulating the vertical position of the tool spindle whilst rotating.

An embodiment of an apparatus suitable to be used for the manufacture of peripheral profiles closed in themselves is given by way of example in the accompanying diagrammatical drawings, wherein Figure 1 is a side elevation, Figure 2 is longitudinal section. Figure 3 is a view on an enlarged scale.

The table of the grinding machine can be either movable longitudinally as illustrated or rotated.

On the table $a$ are screwed two brackets $b$ and $c$ which at the same time form bearings. In the bracket $c$ is mounted a worm drive $d$, $e$. In Figure 1 the worm shaft $d$ is not shown in interest of clearness. In the worm wheel $e$ is provided a bush or sleeve $f$ which passes through the upper part of the bracket $c$. In the sleeve is mounted an adjustable spindle $g$ which is free to revolve and on which is mounted a template holder $h$ with the template $i$. In the bracket $b$ is mounted a simple spindle $k$ with the locking device $l$ therefor.

On each of the two spindles $g$ and $k$ is mounted a Morse cone which is provided with a clamping plate or jaw $m$, which can be exchanged to suit the length of the work.

If circumstances warrant it, the two templates $i$ can be held with the clamping plates or $m$ in a position axial to the grinding roller $n$, by means of connecting bolts $o$.

The templates $i$ are shown only in side view but they may have any suitable peripheral guiding surface depending on the desired shape of the articles. The whole profile of the work $r$ (Figure 1) is ground during one continued revolution of the work together with the simultaneous revolution of the templates while the table is moved respectively. Thereby very sharp edges are obtained.

In the case of simultaneous rotation of the crank $p$ of the rotating device and movement of the transporting table $a$, the latter with its parts and with the work piece held between the jaws $m$ will be advanced towards the grinding roller $n$, whereby the adjustable templates are pressed against the rollers $q$.

As the whole grinding part of the apparatus is adjustable, and the fork carrying the grinding roller is movable in the horizontal as well as in the vertical plane, the grinding roller will easily and accurately follow the lines and curves of the templates.

Instead of the manually operated crank $p$, a power drive with gearing can be provided.

It is advisable to grind the end faces of the articles before the introduction into the apparatus, so as to facilitate the fixing.

What I claim and desire to secure by Letters Patents of the United States is:

1. A process for the manufacture of pipe shelves, keystones, annular stones and bricks, consisting in first moulding and then burning such articles, the accurate sizing of which is first advisable at the place of use, with a supply of so much more material than will be necessary for the finished product that it is possible to obtain economically an accurate machine finishing of the peripheral profiles closed in themselves, whereupon these peripheral profiles are worked to the exact measurements by machine grinding.

2. A process for the manufacture of pipe shelves, keystones, annular stones and bricks, consisting in first moulding and then burning such articles, the accurate sizing of which is first advisable at the place of use, with a supply of so much more material than will be necessary for the finished product that it is possible to obtain economically an accurate machine finishing of the peripheral profiles closed in themselves, whereupon at first the faces of said articles being located angularly to the peripheral profiles closed in themselves are ground for obtaining clamping faces and then the peripheral profiles are worked to the exact measurements by machine grinding.

3. A process for manufacture of pipe shelves, keystones, annular stones and bricks, said articles being moulded and then burned with oversize dimensions, being then revolved about a horizontal axis in contact with an abrasive surface revolving about a second axis, which axis may be varied with respect to the first mentioned axis to give a definite shape and size to said articles revolving thereon.

WILHELM KOSFELD.